US012326275B2

(12) United States Patent
Mhetar et al.

(10) Patent No.: US 12,326,275 B2
(45) Date of Patent: Jun. 10, 2025

(54) AIR-COOLING SYSTEM

(71) Applicant: Kraton Polymers LLC, Houston, TX (US)

(72) Inventors: Vijay Mhetar, Houston, TX (US); Roger Tocchetto, Houston, TX (US)

(73) Assignee: Notark Corporation, Houston, TX (US)

(*) Notice: Subject to any disclaimer, the term of this patent is extended or adjusted under 35 U.S.C. 154(b) by 68 days.

(21) Appl. No.: 17/995,936

(22) PCT Filed: Jun. 1, 2021

(86) PCT No.: PCT/US2021/070646
§ 371 (c)(1),
(2) Date: Oct. 11, 2022

(87) PCT Pub. No.: WO2021/248156
PCT Pub. Date: Dec. 9, 2021

(65) Prior Publication Data
US 2023/0341136 A1 Oct. 26, 2023

Related U.S. Application Data

(60) Provisional application No. 63/129,206, filed on Dec. 22, 2020, provisional application No. 62/704,864, filed on May 31, 2020.

(51) Int. Cl.
F24F 5/00 (2006.01)

(52) U.S. Cl.
CPC ................... F24F 5/0035 (2013.01)

(58) Field of Classification Search
CPC ............ F24F 5/0035; F24F 3/14; B01D 71/82
See application file for complete search history.

(56) References Cited

U.S. PATENT DOCUMENTS 5,103,897 A * 4/1992 Cullimore ................ B64G 1/50
165/41
6,485,545 B1 11/2002 Ohlrogge
(Continued)

FOREIGN PATENT DOCUMENTS

CN 105674452 A 6/2016
DE 10002692 A1 8/2001
(Continued)

Primary Examiner — Elizabeth J Martin
Assistant Examiner — Keith Stanley Myers

(57) ABSTRACT

An air-cooling system includes an evaporator adapted to cool an air and a reservoir for storing a liquid and providing the liquid to the evaporator. The air-cooling system also includes a pressure reducer system fluidly coupled to the evaporator and adapted to create a relatively low pressure inside the evaporator to facilitate a conversion of the liquid flowing through the evaporator into vapors. The pressure reducer system includes a liquid ejector having an inlet portion adapted to receive the liquid from the reservoir, a throat portion arranged downstream of the inlet portion and fluidly coupled to the evaporator and an outlet portion disposed downstream of the throat portion and configured to increase a pressure inside the liquid ejector. The pressure reducer system also includes a pump fluidly connected to the liquid ejector and the reservoir to supply the liquid from the reservoir to the liquid ejector.

18 Claims, 7 Drawing Sheets

(56) References Cited

U.S. PATENT DOCUMENTS

| | | | |
|---|---|---|---|
| 2002/0096312 A1 | 7/2002 | Korin | |
| 2011/0259039 A1* | 10/2011 | Ma | F25B 15/02 |
| | | | 62/495 |
| 2012/0117987 A1 | 5/2012 | Claridge | |
| 2012/0118146 A1 | 5/2012 | Claridge | |
| 2015/0329516 A1* | 11/2015 | Hagen | C08G 63/785 |
| | | | 202/205 |
| 2020/0292219 A1* | 9/2020 | Li | F04F 5/46 |
| 2022/0341440 A1* | 10/2022 | Brenne | F04C 29/0092 |

FOREIGN PATENT DOCUMENTS

| | | | |
|---|---|---|---|
| EP | 2353699 | A1 | 8/2011 |
| EP | 3421374 | A1 | 1/2019 |
| FR | 2672968 | A1 | 8/1992 |

* cited by examiner

AIR-COOLING SYSTEM

CROSS-REFERENCE TO RELATED APPLICATIONS

This application is a 371 of international application no. PCT/US2021/070646 filed on Jun. 1, 2021, which claims priority to and the benefit of U.S. Provisional Patent Application Nos. 62/704,864, filed on May 31, 2020, and 63/129,206 filed on Dec. 22, 2020, the contents of which are hereby incorporated by reference herein for all purposes.

TECHNICAL FIELD

The disclosure relates to an air-cooling system having an evaporator and a liquid ejector to reduce to a pressure inside the evaporator to cool air flowing over the evaporator.

BACKGROUND

With the changing climate, global warming, and urbanization there is an increase in demand of air-cooling systems for cooling an interior of an occupied space. An air-cooling system, generally, include a refrigerant or a desiccant dehumidifier for removing heat and humidity from the air. However, the operation of air-conditioners requires high energy. Traditional refrigerant based air conditioners manage sensible and latent loads in a combined step, as moisture is extracted through vapor condensation around heat exchangers during the refrigerant evaporation stage. This process is energy intensive and inefficient.

Air coolers, such as, desert coolers, or cooling towers are also used for providing relatively cool air to the interior of an occupied space. These systems generally work on water evaporation principle and cool the air by evaporating water from a surface. However, these systems do not necessarily work well in the humid environment.

U.S. Pat. No. 8,496,732 discloses an air-cooling system for dehumidifying air by establishing a humidity gradient across a water selective permeable membrane in a dehumidification unit. The humidity gradient is established by creating a vacuum on one side of the membrane using a vacuum pump that creates the vacuum by compressing air. Due to the compressible nature of the air, creating vacuum by compressing air is relatively less efficient and consumes more energy. Additionally, vacuum pumps creating vacuum by compressing air generally use a large fraction of non-condensable fluid, such as, dry air, for operation, and do not respond well in environments containing high condensable load, such as, water vapor or moisture. Further, the air-cooling system includes a condenser for condensing water vapors extracted from the air.

Hence, there is still a need for improved air-cooling systems to facilitate removal of heat from the air, which is energy efficient.

SUMMARY

In a first aspect, an air-cooling system is disclosed. The air-cooling system is pressurizable and vacuum resistant. The system includes an evaporator adapted to cool an air passing through the evaporator and a reservoir for storing a liquid and fluidly connected to the evaporator and providing the liquid to the evaporator. The system further includes a pressure reducer system fluidly coupled to the evaporator and adapted to create a pressure less than or equal to a saturated vapor pressure of the liquid at an ambient temperature inside the evaporator to facilitate a conversion of at least a portion of the liquid flowing through the evaporator into vapors. The pressure reducer system includes a liquid ejector and a pump. The liquid ejector includes an inlet portion adapted to receive the liquid from the reservoir, a throat portion arranged downstream of the inlet portion and fluidly coupled to the evaporator. The throat portion is adapted to increase a velocity of the liquid received from the inlet portion. The liquid ejector also includes an outlet portion disposed downstream of the throat portion and configured to increase a pressure inside the liquid ejector to facilitate a condensation of the vapors received from the evaporator. The pump is fluidly connected to the liquid ejector and the reservoir and is configured to supply the liquid from the reservoir to the liquid ejector.

According to one embodiment, the pressure reducer system further includes a booster pump arranged upstream of the liquid ejector and fluidly coupled to the evaporator to reduce the pressure inside the evaporator to a pressure below a saturated vapor pressure of the liquid.

In one embodiment, the liquid is water and the booster pump facilitates in reducing the pressure to a value less than or equal to 31.7 mbarA at 25 degree Celsius.

In one embodiment, the booster pump facilitates in reducing the pressure to a value less than the saturation vapor pressure of the fluid in the evaporator.

In one embodiment, the booster pump facilitates in reducing the pressure to a value between 20 mbarA and 40 mbarA, or between 10 mbarA and 20 mbarA.

According to one embodiment, the reservoir includes a drain valve for facilitating a drainage of the liquid from the reservoir when a level of the liquid reaches above a first threshold level.

In some embodiments, the reservoir is made of a thermally conductive material to facilitate a heat transfer from the liquid stored inside the reservoir to an ambient.

In some embodiments, the air-cooling system further includes a heat exchanger fluidly connected to the liquid ejector and configured to receive at least a portion of the liquid exiting the liquid ejector. The heat exchanger is configured to cool the received liquid.

In one embodiment, the heat exchanger is disposed upstream of the reservoir and supply the cooled liquid to the reservoir.

In one embodiment, the liquid ejector is a water ejector adapted to receive liquid water from the pump.

According to an embodiment, the air-cooling system also includes a metering valve arranged between the reservoir and the evaporator to control a flow of the liquid from the reservoir to the evaporator.

In some embodiments, the air-cooling system further includes a dehumidification core arranged upstream or downstream of the evaporator and adapted to fluidly couple with the liquid ejector. The dehumidification core includes an air channel, at least one vapor channel separated from the air channel, and a membrane separating the at least one vapor channel from the air channel and adapted to facilitate a removal of moisture from an air flowing through the air channel. The membrane is selectively permeable to water and water vapor and impermeable to air. Moreover, the throat portion is fluidly coupled to the at least one vapor channel to create a relatively lower pressure within the at least one vapor channel than in the air channel to facilitate a flow of moisture from the air flowing through the air channel to the at least one vapor channel. Also, the outlet portion facilitates a condensation of the water vapors received from the at least one vapor channel.

In one embodiment, the membrane comprises, consists essentially of, or consists of a sulfonated polymer.

According to an embodiment, air-cooling system also includes a valve arranged between pressure reducer system and the dehumidification core to control the fluid connection of the dehumidification core with the pressure reducer system.

In one embodiment, a pressure inside the reservoir is reduced to a value that is greater than the saturated vapor pressure of the liquid at an ambient temperature by at least 5%, or 7-20%, or up to 25% at the start of air-cooling system.

In one embodiment, when the liquid is water, a pressure inside the reservoir is reduced to a value between 40 mbarA to 150 mbarA at the start of air-cooling system In one embodiment, the air-cooling system, before starting, is preconditioned to a pressure value that is greater than the saturated vapor pressure of the liquid by >5%, or 7-20%, or up to 25%.

In a second aspect, an air-cooling system is disclosed. The air-cooling system includes at least one dehumidification core defining an air channel and at least one vapor channel separated from the air channel. The dehumidification core further includes a membrane separating the at least one vapor channel from the air channel. The membrane is adapted to facilitate a removal of moisture from the air flowing through the air channel. Moreover, the membrane is selectively permeable to water and water vapors and impermeable to air. The air-cooling system further includes an evaporator adapted to cool the air passing over the evaporator and arranged upstream or downstream of the dehumidification core. Furthermore, the air-cooling system includes a pressure resistant reservoir for storing a liquid and fluidly connected to the evaporator for providing the liquid to the evaporator. Moreover, the air-cooling system includes a pressure reducer system fluidly coupled to at least one of the evaporator or the dehumidification core. The pressure reducer system is adapted to create pressure less than or equal to a saturated vapor pressure of the liquid at an ambient temperature inside the evaporator to facilitate a conversion of at least a portion of the liquid flowing through the evaporator into vapors when fluidly coupled to the evaporator. The pressure reducer system is also adapted to create a relatively lower pressure inside the at least one vapor channel than the air channel to facilitate an extraction of moisture from the air flowing through the air channel to the at least one vapor channel when fluidly coupled to the dehumidification core. The pressure reducer system includes a liquid ejector and a pump. The liquid ejector has an inlet portion adapted to receive the liquid from the reservoir, and a throat portion arranged downstream of the inlet portion and fluidly coupled to the at least one of the evaporator or the at least one vapor channel. The throat portion is adapted to increase a velocity of the liquid received from the inlet portion. The liquid ejector also includes an outlet portion disposed downstream of the throat portion and configured to increase a pressure inside the liquid ejector to facilitate a condensation of the vapors received from the at least one of the evaporator or the dehumidification core. The pump is fluidly connected to the liquid ejector and the reservoir and configured to supply the liquid from the reservoir to the liquid ejector.

According to one embodiment, the air-cooling system also includes at least one valve to control fluidly coupling of the pressure reducer system to at least one of the evaporator or the dehumidification core.

In one embodiment, the at least one valve includes a first valve to control the fluid coupling of the evaporator and the pressure reducer system, and a second valve to control the fluid coupling of the dehumidification core and the pressure reducer system.

In an embodiment, the pressure reducer system further includes a booster pump arranged upstream of the liquid ejector to reduce the pressure inside at least one of the evaporator to a pressure below a saturated vapor pressure of the liquid or the at least one vapor channel of the dehumidification core to a pressure below a saturated vapor pressure of the water.

In one embodiment, the liquid is water and the booster pump facilitates in reducing the pressure to a value less than or equal to 31.7 mbarA at 25 degree Celsius.

In one embodiment, the booster pump facilitates in reducing the pressure to the saturation vapor pressure of the fluid in the evaporator, or a value between 20 mbarA and 40 mbarA, or between 10 mbarA and 20 mbarA.

In one embodiment, the reservoir includes a drain valve for facilitating a drainage of the liquid from the reservoir when a level of the liquid reaches above a first threshold level.

In some embodiments, the reservoir is made of a thermally conductive material to facilitate a heat transfer from the liquid water stored inside the reservoir to an ambient.

In an embodiment, the air-cooling system further includes a heat exchanger fluidly connected to the liquid ejector and configured to receive at least a portion of the liquid exiting the liquid ejector. The heat exchanger is configured to cool the received liquid. In some embodiments, the heat exchanger is disposed upstream of the reservoir and supply the cooled liquid to the reservoir.

In one embodiment, the liquid ejector is a water ejector adapted to receive liquid water from the pump.

In embodiments, the air-cooling system also includes a metering valve arranged between the reservoir and the evaporator to control a flow of the liquid from the reservoir to the evaporator.

In one embodiment, a pressure inside the reservoir is reduced to a value that is greater than the saturated vapor pressure of the liquid at an ambient temperature by >5%, or 7-20%, or up to 25% at the start of air-cooling system.

In one embodiment, a pressure inside the reservoir is reduced to a value of at least 30 mbarA, or between 40 mbarA to 150 mbarA, or less than 120 mbarA at the start of air-cooling system when the liquid is water.

In one embodiment, the air-cooling system, before starting, is preconditioned to a pressure value that is greater than the saturated vapor pressure of the liquid by >5%, or 7-20%, or up to 25%.

DETAILED DESCRIPTION

Figure 1:
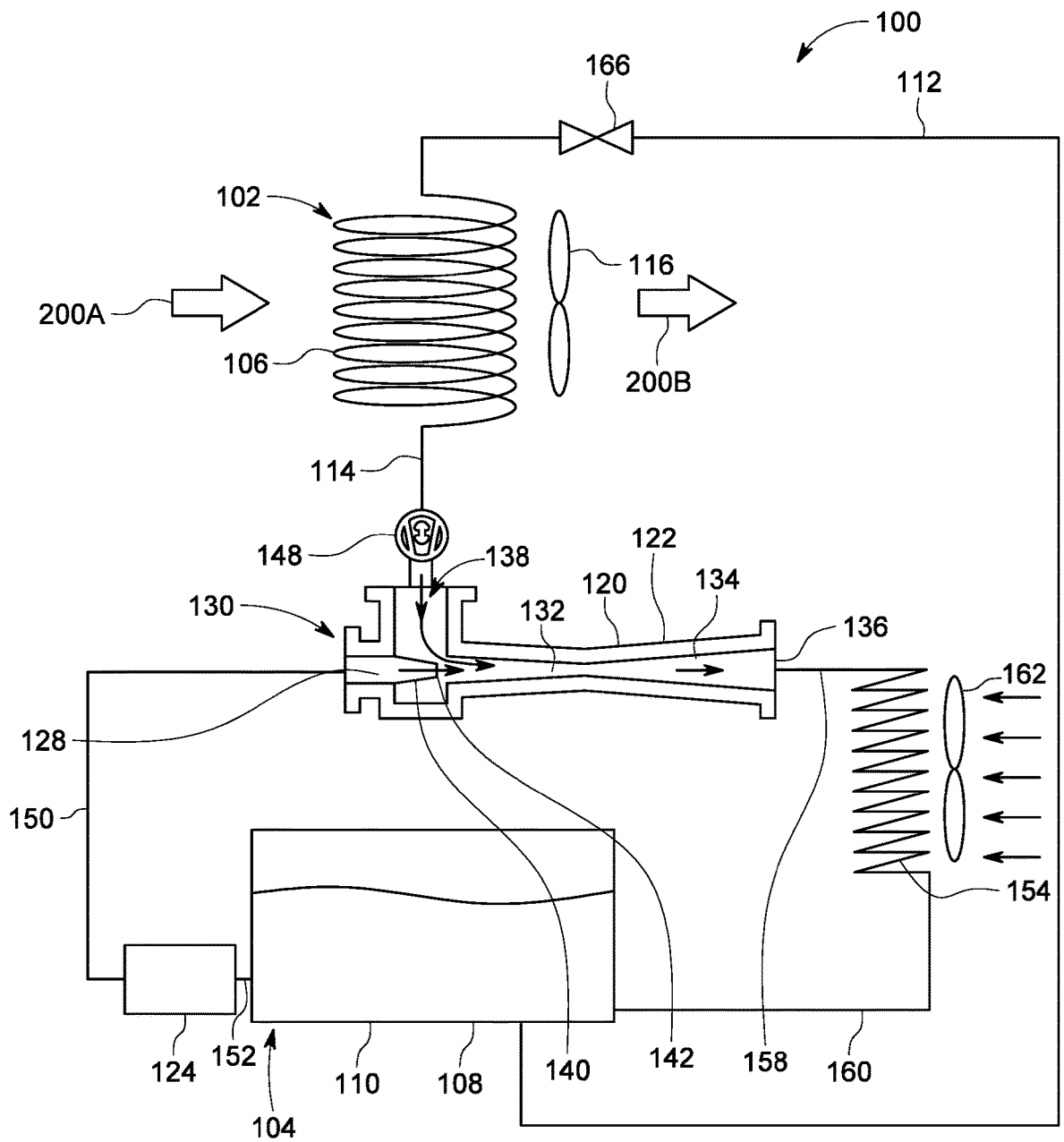
FIG. 1 is a schematic view of an embodiment of an air-cooling system having an evaporator and a pressure reducer system connected to the evaporator.

The following terms used the specification have the following meanings:

"Ion Exchange Capacity" or IEC refers to the total active sites or functional groups responsible for ion exchange in a polymer. Generally, a conventional acid-base titration method is used to determine the IEC, see for example International Journal of Hydrogen Energy, Volume 39, Issue 10, Mar. 26, 2014, Pages 5054-5062, "Determination of the ion exchange capacity of anion-selective membrane." IEC is the inverse of "equivalent weight" or EW, which the weight of the polymer required to provide 1 mole of exchangeable protons.

"At least one of A or B" as in example of "at least one of [a group such as A, B, or C]" or "any of [a group such as A, B, or C]" means a single member from the group, more than one member from the group, or a combination of members from the group. For example, at least one of A, B, or C includes, for example, A only, B only, or C only, as well as A and B, A and C, B and C; or A, B, and C, or any other all combinations of A, B, and C.

A list of embodiments presented as "A, B, or C" is to be interpreted as including the embodiments, A only, B only, C only, "A or B," "A or C," "B or C," or "A, B, or C." For example, "at least one of an evaporator or a dehumidification core" includes, only evaporator, only dehumidification core, as well as, both the evaporator and the dehumidification core.

The disclosure relates to air-cooling systems for facilitating cooling air and/or removing moisture from an air. The system comprises, consists essentially of, or consists of an evaporator, a reservoir, and a pressure reducer system having a liquid ejector, and a pump connected to the liquid ejector and the reservoir. In embodiments, the air-cooling system further includes a dehumidification core arranged upstream or downstream of the evaporator and adapted to fluidly couple with the liquid ejector. The dehumidification core is characterized as having a membrane which is selectively permeable to water and water vapor, and impermeable to air.

Liquid for Use in Air Cooling System: Although the liquid ejector referenced herein is contemplated as a water ejector, and water is used as the liquid or the motive fluid, it may be appreciated that any other suitable non-compressible liquid can also be used in the air cooling system. Therefore, references to water can include other liquid, such as but not limited to acetone, acentonitrile, acrolein, acrylonitrile, alcohols (e.g., ethyl, allyl, butyl, methyl, propyl among others), allylamine, aniline, anisole, benzene, chloroform, cyclohexane, cyclopentane, diethyl ether, ethanol, chemical refrigerants (including R-11, R-12, R-22), isopentane, and methyl acetate.

Liquid Ejector: The liquid ejector works on a venturi effect and has a constricting throat portion that has a relatively less diameter and through which the liquid, for example, water, is pumped. As the liquid flows through the throat portion, a velocity, or a speed of the liquid increases, resulting into a lower pressure inside the throat portion. The low pressure is communicated to the vapor channels and/or the evaporator. In this manner, the liquid ejector facilitates in creating a pressure differential between the air channels and the vapor channels of the dehumidification core to enable a flow of the moisture from the air flowing through the air channel to the vapor channels when connected to the dehumidification core. Also, the liquid ejector facilitates in creating a vacuum or low pressure inside the evaporator to enable a conversion at least a portion of the liquid flowing inside the evaporator to vapors. To control a reduction of the pressure inside the throat portion, a velocity and a volume of the liquid entering an inlet portion of the liquid ejector is controlled.

In one embodiment for use with water, the liquid ejector may generate a vacuum pressure of 40 mbar to 120 mbar. It may be appreciated that vacuum generation capacity of the liquid ejector is limited by the saturated vapor pressure of the liquid. In an embodiment, the liquid ejector may create a pressure of less than equal to 960 mbar gage pressure.

To further increase a vacuum level inside the vapor channels or decrease/reduce the pressure inside the vapor channels, the booster pump arranged upstream of the liquid ejector and is fluidly coupled to the at least one of the evaporator and the dehumidification core.

Booster Pump: The booster pump is a root pump that generally includes at least a pair of meshing lobes rotating in opposite directions. Fluid is trapped in pockets surrounding the lobes and carried from the inlet side to outlet side. The booster pump facilitates in decreasing the pressure inside the vapor channels to a pressure less than or equal to a partial vapor pressure of water and/or facilitates in decreasing the pressure inside the evaporator to a pressure less than or equal to a saturated vapor pressure of the liquid at ambient temperature. In an embodiment, the liquid is water, the saturated vapor pressure of water at 25 degree Celsius is approximately 31.7 mbarA. In an embodiment, the booster pump in combination with the liquid ejector facilitates a creation of pressure less than or equal to 20 mbarA inside vapor channels and/or the evaporator. In some embodiments the booster pump facilitates in reducing the pressure to a value between 10 mbarA to 20 mbarA. In one embodiment, the booster pump reduces the pressure to less than or equal to 10 mbarA. In some embodiments the booster pump facilitates in reducing the pressure to a value between 20 mbarA to 40 mbarA. In some embodiments, the booster pump facilitates in the reducing the pressure to a value less than 150 mbarA.

Membrane: The membrane for use in the system is a moisture permeable membrane having excellent moisture vapor transport rates (MVTR) characteristics, and excellent ionic exchange capacity (IEC). The membrane is characterized as being selectively permeable, i.e., permeable to air moisture but not to the other air components. In embodiments, the membrane is largely impermeable to air. In embodiments, the membrane is characterized as having MVTR of MVTR of >100, or >500, or >1,000 g/m$^2$ per day. ASTM E-96B and ASTM F1249 specify standard methods for measuring MVTR. In embodiments, the membrane is characterized as having air permeability to be less than say less than 5 g/m$^2$ per day.

In embodiments, the membrane is characterized is characterized has having favorable ion-exchange capacity and proton conductivity, and glass transition temperature, providing both flexibility and material strength, and good stability and swelling properties even when hydrated. The membrane is formed mostly or substantially entirely from a sulfonated polymer (SP) being sufficiently sulfonated to contain from 10-100 mol % sulfonic acid or sulfonate salt functional groups based on the number of monomer units in the copolymer. In embodiments, the SP is used to form a coating on a substrate surface with the substrate made of same or different material. In other embodiments, the membrane is used as a single or multiple SP layers or films, each with a certain or pre-selected thickness.

In embodiments, the SP is a sulfonated block copolymer having a block copolymer molecular architecture with three or more blocks, designed to phase separate and form ion-conducting domains which enable water transmission, process that can be accelerated through application of voltage. In embodiments, the SP is selected from the group of perfluorosulfonic acid polymers such as sulfonated tetrafluoroethylene copolymer, polystyrene sulfonates, sulfonated block copolymers, polysulfones such as polyether sulfone, polyketones such as polyether ketone, and mixtures thereof.

In embodiments, the sulfonated polymer is characterized as being sufficiently or selectively sulfonated to contain from 10-100 mol % sulfonic acid or sulfonate salt functional groups based on the number of sulfonatable monomer units in the sulfonated copolymer ("degree of sulfonation"). In embodiments, the sulfonated polymer has a degree of sulfonation of >25 mol %, or >50 mol %, or <95 mol %, or 25-70 mol %.

In embodiments, the sulfonated polymer is characterized as having self-sterilizing effect, for killing at least 99% of microbes within 5 minutes of coming into contact with the coating material.

In embodiments, the sulfonated polymer is a sulfonated block copolymer, having one or more copolymer block configurations corresponding to any of A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, X is a coupling agent residue, and wherein each D block is preferably a polymer block resistant to sulfonation. In embodiments, the SP has a linear structure corresponding to A-B-A, (A-B)$_2$X, A-B-D-B-A, (A-B-D)$_2$X, A-D-B-D-A, and (A-D-B)$_2$X, or a radial structure corresponding to (A-B)$_n$X and (A-D-B)$_n$X, where n ranges from 3 to 6. Two or more of the A, B, C, and D-blocks may be the same or different.

In embodiments, the A-blocks are polymer segments of acrylic esters or methacrylic esters. In embodiments, the A-blocks are selected from polymerized para-substituted styrene monomers, ethylene, alpha olefins of 3 to 18 carbon atoms, 1,3-cyclodiene monomers, monomers of conjugated dienes having a vinyl content less than 35 mol percent prior to hydrogenation, acrylic esters, methacrylic esters, and mixtures thereof. If the A-blocks are polymers of 1,3-cyclodiene or conjugated dienes, the blocks are preferably hydrogenated after polymerization of the block copolymer and before sulfonation of the block copolymer. If the A-blocks are hydrogenated polymers of 1,3-cyclodiene monomers, such monomers may be selected from the group consisting of 1,3-cyclohexadiene, 1,3-cycloheptadiene and 1,3-cyclooctadiene. The A-blocks may contain up to 15 mol percent of the vinyl aromatic monomers such as those present in the B blocks.

The B blocks may contain from about 10 to about 100 mol percent sulfonic acid or sulfonate ester functional groups based on the number of monomer units, and comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenyl ethylene monomer, and mixtures thereof.

The D-block may comprise a hydrogenated polymer or copolymer of a conjugated diene selected from isoprene, 1,3-butadiene, and mixtures thereof.

X is a coupling agent residue, with the coupling agent selected from those known in the art, including polyalkenyl coupling agents, dihaloalkanes, silicon halides, siloxanes, multifunctional epoxides, silica compounds, esters of monohydric alcohols with carboxylic acids, (e.g. methylbenzoate and dimethyl adipate) and epoxidized oils.

In embodiments, the SP is hydrogenated sulfonated block copolymer having the general configuration A-B, A-B-A, (A-B).sub.n, (A-B-A)$_n$X, (A-B)$_n$X or mixtures thereof, where n is an integer from 2 to about 30, and X is coupling agent residue. Prior to hydrogenation, each A block is a mono alkenyl arene polymer block and each B block is a controlled distribution copolymer block of at least one conjugated diene and at least one mono alkenyl arene. Subsequent to hydrogenation about 0-10% of the arene double bonds have been reduced, and at least about 90% of the conjugated diene double bonds have been reduced. Each A block has a number average molecular weight between about 3,000 and about 60,000. Each B block has a number average molecular weight between about 30,000 and about 300,000. Each B block comprises terminal regions adjacent to the A blocks that are rich in conjugated diene units and one or more regions not adjacent to the A blocks that are rich in mono alkenyl arene units. The total amount of mono alkenyl arene in the hydrogenated block copolymer is about 20 percent by weight to about 80 percent by weight. The weight percent of mono alkenyl arene in each B block is between about 10 percent and about 75 percent; at least 25% of the aromatic rings of the alkenyl arene are sulfonated. The hydrogenated sulfonated block copolymer has an ionic conductivity greater than 0.08 siemens/cm.

In embodiments, the sulfonated copolymer is a sulfonated tetrafluoroethylene copolymer having a polytetrafluoroethylene (PTFE) backbone; side chains of vinyl ethers (e.g., —O—CF$_2$—CF—O—CF$_2$—CF$_2$—) which terminate in sulfonic acid groups in a cluster region.

In embodiments, the sulfonated polymer is a polystyrene sulfonate, examples include potassium polystyrene sulfonate, sodium polystyrene sulfonate, a co-polymer of sodium polystyrene sulfonate and potassium polystyrene sulfonate (e.g., a polystyrene sulfonate copolymer), having a molecular weight of >100,000 Daltons, >400,000 Daltons, and up to 1,500,000 Daltons. The polystyrene sulfonate polymers can either be crosslinked or uncrosslinked. In embodiments, the polystyrene sulfonate polymers are uncrosslinked and water soluble.

In embodiments, the sulfonated polymer is a polysulfone, selected from the group of aromatic polysulfones, polyphenylenesulfones, aromatic polyether sulfones, dichlorodiphenoxy sulfones, sulfonated substituted polysulfone polymers, and mixtures thereof. In embodiments, the sulfonated polymer is a sulfonated polyethersulfone copolymer, which can be made with reactants including sulfonate salts such as hydroquinone 2-potassium sulfonate (HPS) with other monomers, e.g., bisphenol A and 4-fluorophenyl sulfone. The degree of sulfonation in the polymer can be controlled with the amount of HPS unit in the polymer backbone.

In embodiments, the sulfonated polymer is a polysulfone is a polyarylether ketone, e.g., a sulfonated polyether ketone (SPEEK), obtained by sulfonating a polyetherketonketone (PEKK). The polyether ketone ketone is manufactured using diphenyl ether and a benzene dicarbonic acid derivative. The sulfonated PEEK is available as an alcohol and/or water-soluble product for subsequent used for coating membranes, for casting into membranes and films.

With the use of the sulfonated copolymer, the SP membrane is hydrophilic and hygroscopic, and also permeable to moisture but not air and gases such as nitrogen and oxygen. The membrane containing sulfonated copolymer is characterized as selectively permeable with ion exchange properties. The SP membrane is also characterized as having excellent moisture vapor transport rates (MVTR) characteristics and excellent ionic exchange capacity.

The SP membrane is also characterized as undergoing considerable swelling when it absorbs water, e.g., at least 100% at ambient temperature. In embodiments with the use of sulfonated block copolymer having a degree of sulfonation (e.g., at least 25 mol %), the SP membrane also shows anti-bacterial properties, particularly useful for sterilizing air in addition to cooling, in indoor spaces.

In embodiments, the SP has an IEC of >0.5 meq/g, or 1.5-3.5 meq/g, or >1.25 meq/g, or >2.2 meq/g, or >2.5 meq/g, or >4.0 meq/g, or <4.0 meq/g.

In embodiments, the SP membrane (film) or a coating containing SP has a thickness of >1 µm, or >5 µm, or 5-50 µm, or <100 µm, or <75 µm, or <µm. In embodiments, the membrane/coating may comprise nanocomposite materials and can have an average pore size <1 µm, or <0.5 µm, or <0.1 µm.

In use, moisture from air can be extracted by a water permeable membrane by creating a pressure differential between the inlet side and the downstream end or section of a membrane assembly, which drives the diffusion of the water molecules from the inlet side towards the other side of the membrane.

In embodiments, the SP membrane may be in forms other than sheets, e.g., netting, screen mesh or lattice, woven, non-woven, perforated or apertured plate, a foam, a hollow fiber membrane, or a pad having interconnecting interstices and passageways throughout the body, having the SP coated or bonded thereon. In embodiments, the SP membranes can be in spiral form or arranged in stacks, either parallel or perpendicular to the air stream direction.

In embodiments, the SP membrane is in the form of hollow fibers. Humid air flows through the hollow fibers, which are under vacuum. The hollow fibers provide a large dehumidification surface area and may be oriented parallel or perpendicular to the air flow. When the inside of the hollow fiber membrane is placed under vacuum, an osmotic gradient is generated between each of the fiber's hollow core (which are substantially under vacuum) and the fiber's outer surface. In embodiments of hollow membranes, SP coatings or films may be applied on the inner, outer, or both inner and outer surfaces of the hollow fibers. Hollow fiber membranes are known in the art, e.g., as disclosed in U.S. patent Ser. No. 05/762,798, which is incorporated herein by reference.

The membrane may comprise SP bonded or incorporated onto a frame, another one or more membranes, a polymer matrix, or a plurality of fiber bundles by processes known in the art, e.g., casting. The SP membrane can also be applied as a coating on a fiber matrix, or on the fan blades in the evaporative cooler.

The membrane can be bonded to a frame or another perforated layer serving as a support structure through which air and humidity can flow freely. A frame may comprise a metal or plastic and may be formed into any conceivable geometry, including, but not limited to, honeycomb and corrugated structures. In embodiments, the frame may have a honeycomb, spiral, non-woven or a plurality of porous designs for high surface area, with the proton conducting membrane being employed on multiple sides and with one side as opening for the air to flow in. In other embodiments, the frame is shaped as corrugated sheets with channels for increased exposed area. Depending on, for example, the amount of moisture to be removed or the size of the room, the number of membrane frames may also be varied by adding or taking out one or more frames.

The form-retaining frame can be thermally or mechanically formed and are preferably rigid, semi-rigid, or substantially rigid. As used herein, a rigid, semi-rigid or substantially rigid frame is a frame comprising a material or structure able to maintain its shape under its own weight. Suitable frame materials include fiberglass, aluminum, carbon, or a rigid polymer based on polyester, polyethylene, polypropylene, polyethylene terephthalate, polyvinylchloride, a styrene/acrylonitrile/butadiene copolymer, nylon, polytetrafluoroethylene, aramid-based polymeric fibers, metal, metal alloys, cellulose, cellulose nitrate, cellulose acetate, and combinations thereof.

Operation: In embodiments, the air-cooling systems facilitate cooling of the air and/or removal of moisture from the air to reduce humidity level in the air supplied to a room with minimal consumption of energy. For cooling the air, the air-cooling system includes an evaporator through which a liquid, for example, water flow, and a pressure reducer system having a liquid ejector and a booster pump to reduce the pressure inside the evaporator. The pressure inside the evaporator is reduced to a value equal to or above a saturated vapor pressure of the liquid at an ambient temperature. Accordingly, the liquid gets converted into vapors as the liquid flows through the evaporator, and absorbs latent heat of vaporization from the air passing over the evaporator, thereby cooling the air.

To reduce the humidity level of the air, the air-cooling system includes a dehumidification core with a membrane adapted to facilitate a removal of moisture from the air flowing through an air channel of the membrane. The membrane is selectively permeable to water and water vapors and is impermeable to air. The dehumidification core is fluidly coupled to the pressure reducer system to create a vacuum inside a vapor channel of the membrane to extract moisture from air flowing through the air channel of the membrane. Accordingly, the pressure reducer system facilitates in creating a pressure differential between the vapor channels and the air channels of the dehumidification core to enable a flow of moisture inside the vapor channels from the air channels. In an embodiment, the pressure differential or the vacuum may corresponds to a saturated vapor pressure of the water at an ambient. Also, the pressure reducer system is selectively connected to the evaporator and/or dehumidification core.

For reducing the temperature of an air being provided to a room or an area, the liquid from the reservoir is provided to the evaporator via an inlet conduit, and also, the evaporator is connected to the pressure reducer system to create a pressure below a saturated vapor pressure of the liquid at an ambient temperature inside the evaporator. For so doing, the liquid ejector and optionally the booster pump are operated. For operating the liquid ejector, the liquid from the reservoir is pumped to the inlet portion of the liquid ejector. Subsequently, the liquid enters the throat portion of the liquid ejector. As a cross-sectional area of the throat portion or a diameter of the throat portion is less than a cross-sectional area of the inlet portion, a velocity of the liquid inside the throat portion increases due to a venturi effect. Accordingly, a pressure inside the throat portion decreases. As the throat portion is in communication with the booster pump and the evaporator, a corresponding low pressure inside the evaporator is created. It may be appreciated that the liquid ejector and/or the booster pump are controlled such that the pressure inside the evaporator decrease to a value less than or equal to the saturated vapor pressure of the liquid at the ambient temperature. Due to the decrease in the pressure inside the evaporator, at least a portion of the liquid flowing inside the evaporator is converted into vapors. The process of vaporization of the liquid in the evaporator absorbs the sensible energy of the passing ambient air on the outside of the evaporator, delivering cooled air to the room.

In an embodiment, the booster pump may be omitted. In such a case, the entire system is preconditioned at a pressure just above the saturated vapor pressure of the cooling/motive fluid before the system is turned on, and as this is a closed-loop system, the preconditioned pressure is maintained through the life of the system. In an embodiment, the air-cooling system, before starting, is preconditioned to a pressure value that is greater than the saturated vapor pressure of the liquid by 5% to 20%. For example, with the motive fluid being water, the pressure inside the reservoir is reduced to 40 mbarA to 60 mbarA (when the liquid is water). After reducing the pressure inside the reservoir to a desired value, the motive fluid pump is operated to provide the liquid to the liquid ejector, therefore moving mass from evaporator to the liquid reservoir via the liquid ejector. At this instance, two things happen simultaneously: The pressure at the evaporator is further reduced past the saturated vapor pressure of the liquid, causing the liquid to vaporize and absorb heat in the process. This vaporized fluid is now condensing at the liquid ejector, increasing inventory of liquid in the liquid reservoir, therefore increasing the pressure in the reservoir and ejector system relative to the evaporator. In an embodiment, the at least a portion of the liquid flowing to the reservoir from the liquid ejector is cooled by a heat exchanger. This process results in higher efficiency vacuum pressure at the ejector, therefore making the booster pump an optional component.

In embodiments for removing the moisture from the air to be delivered to the room or area, the pressure reducer system is connected to the vapor channels of the dehumidification core, and a reduced pressure increases the moisture gradient between the vacuum and the ambient air sides, therefore accelerating moisture flux from ambient towards the vacuum media and efficiently dehumidifying the ambient air. It is known that moisture flux is greatly increased as pressure approximates and crosses the threshold of water saturated vapor pressure. The water vapors then flow to the throat portion of the liquid ejector and gets converted into liquid water inside an outlet portion of the liquid ejector due to the presence of higher pressure inside the outlet portion, which then flows back to the reservoir. In embodiments, the at least a portion of the liquid flowing to the reservoir from the liquid ejector is cooled by a heat exchanger.

The booster pump and the liquid ejector may be controlled to generate a vacuum (i.e., pressure) depending upon the amount of cooling, the water removal rate, and/or pressure of the reservoir. For example, for a large system, such as a commercial air-cooling system, wherein a relatively greater amount of cooling capacity is needed, the water evaporation needed will proportionally increase, in which case, the booster pump may facilitate in reducing pressure to less than 10 mbar. In such cases, multi-stage or variable speed booster pump may be utilized. Alternatively, for a small establishment where a relatively less water vapor extraction rate is needed and/or less amount of air needs to be cooled, a pressure corresponding to 10 mbar to 20 mbar is sufficient. In such a case, a single stage booster pump may be utilized. Further, a speed of the booster pump may be controlled to vary the pressure inside vapor channels and/or the evaporator.

Reference will be made to the figures, showing various embodiments of the fixture and methods for using thereof.

Referring to FIG. 1, an air-cooling system 100 having an evaporator 102 and a pressure reduce system 104 for reducing a pressure inside the evaporator 102 is shown. The air-cooling system 100 receives an incoming air stream (hereinafter referred to as a first air stream) 200A into a room and delivers or generates an air having relatively reduced temperature (hereinafter referred to as a second airstream 200B). As shown, the evaporator 102 is an evaporator coil 106 fluidly connected to the pressure reducer system 104 and a reservoir 108, for example, water reservoir 110, to receive a liquid, for example, liquid water, from the reservoir 108. The reservoir 108 is a pressure resistant reservoir and is adapted to hold liquid at pressure higher than the atmospheric pressure and is adapted to store the liquid at relatively low pressure. For example, the reservoir 108 can store the liquid at a pressure equal to or less than a vapor pressure (i.e., a saturated vapor pressure) of the liquid. In an embodiment, the liquid is water and the vapor pressure at 25 degree Celsius is approximately 31.7 mbarA. As shown, an inlet of the evaporator 102 is connected to the reservoir 108 via an inlet conduit 112, while an outlet of the evaporator 102 is connected to the pressure reducer system 104 via an outlet conduit 114. Accordingly, the liquid flows to the evaporator 102 from the reservoir 108, gets converted into vapors, for example, water vapors, due a low pressure or vacuum created/generated inside the evaporator 102 by the pressure reducer system 104, and flows back to the reservoir 108 via the pressure reducer system 104. As the liquid is converted into the vapors inside the evaporator 102, the liquid receives the latent energy of conversion into the vapors from the air stream 200A passing over the evaporator 102, and hence gets cooled. To facilitate a suction of the first air stream 200A and the passage of the first air stream 200A over the evaporator 102, the air-cooling system 100 may include a fan 116 arranged downstream of the evaporator 102.

As shown, the pressure reducer system 104 includes a liquid ejector 120, such as, a water ejector 122, fluidly coupled to the outlet of the evaporator 102, a pump 124 to supply the liquid, for example, the liquid water, to the liquid ejector 120, and the reservoir 108 to store the liquid and receive the liquid expelled from the liquid ejector 120.

As shown, the liquid ejector 120 is in fluid communication with evaporator 102 via the outlet conduit 114. Accordingly, the vapors created inside the evaporator flow towards the liquid ejector 120 via the outlet conduit 114 in response to creation of low pressure inside the liquid ejector 120. As shown, the liquid ejector 120 includes an inlet portion 128 defining an inlet port 130 of the liquid ejector 120, a throat portion 132 extending from the inlet portion 128 in a longitudinal direction, and on outlet portion 134 extending from the throat portion 132 and defining an outlet port 136 of the liquid ejector 120. Also, the liquid ejector 120 defines a vapor inlet port 138 fluidly coupled to the evaporator 102 via the outlet conduit 114 and arranged in fluid communication with the throat portion 132 to facilitate a creation/maintenance of relatively low pressure (i.e., vacuum) inside evaporator 102, and an entry of the vapors inside the liquid ejector 120 (i.e., the throat portion 132) from the evaporator 102.

Moreover, the inlet portion 128 may include a nozzle portion 140 defining an orifice 142 to inject/supply the liquid to the throat portion 132 at a relatively high speed, while a cross-sectional area of the outlet portion 134 increases, gradually, from the throat portion 132 to the outlet port 136 to decrease the speed to the liquid received from the throat portion 132. In some embodiments, a cross-sectional area of the inlet portion 128 may decrease, gradually, from the inlet port 130 to the throat portion 132 to facilitate a gradual increase in velocity/speed of the liquid. Accordingly, the inlet portion 128 facilitates in increasing the velocity/speed of the liquid as the liquid flows from the inlet port 130 to the throat portion 132, while the outlet portion 134 is configured to decrease the velocity/speed of the liquid as the liquid flows from the throat portion 132 to the outlet port 136. Consequently, the pressure at the throat portion 132 is lower relative to the pressure at the inlet port 130 and the outlet port 136. A level of the pressure (i.e., vacuum) at the throat portion 132 may be adjusted/controlled by controlling a velocity and/or amount of liquid entering the inlet portion 128. As such, the throat portion 132 is in fluid communication with the evaporator 102, and therefore, a vacuum (i.e., reduced pressure) is created inside the evaporator 102. The level of pressure at the throat portion 132 is controlled in such a manner that the reduced pressure created inside the evaporator 102 is lower than a threshold value. In an embodiment, when the liquid is liquid water, the threshold value is less than equal to a saturated vapor pressure of the water at room temperature to enable a conversion of at least a portion of the liquid water received from the water reservoir 110 via the inlet conduit 112 into water vapors.

To create and maintain the pressure inside the evaporator 102 below the threshold value, the pressure reducer system 104 may include a booster pump 148 arranged between the liquid ejector 120 and the evaporator 102. The booster pump 148 enables a further reduction of pressure, hence increase in vacuum, inside the evaporator 102. In an embodiment, the booster pump 148 and the liquid ejector 120 together reduce the pressure inside the evaporator 102 between 20 mbarA to 40 mbarA. In one embodiment, the pressure reducer system 104 may create a pressure of less than 20 mbarA at the inlet of the booster pump 148. In one embodiment, the pressure reducer system 104 may create a pressure of less than 10 mbarA at the inlet of the booster pump 148. In one embodiment, the pressure reducer system 104 may create a pressure between 10 mbarA and 20 mbarA at the inlet of the booster pump 148. The booster pump 148 and the liquid ejector 120 may be controlled to reduce the pressure inside the evaporator 102 based on a size of the air-cooling system 100 and a desired water extraction rate. In an embodiment, the booster pump 148 is a root pump. However, it may be appreciated that any type of vacuum booster pump known in the art may be utilized.

To control and provide a flow of liquid to the liquid ejector 120, the pump 124 is disposed upstream of the liquid ejector 120 and is fluidly connected to the inlet port 130 via a first pipe 150. In an embodiment, the pump 124 may be a variable speed pump to allow a control of the amount of liquid being pumped to the liquid ejector 120. Further, the pump 124 is connected to the reservoir 108, via a second pipe 152, to receive the liquid from the reservoir 108 and provide the liquid at a desired velocity/speed to the liquid ejector 120. In an embodiment, the reservoir 108 may include a plurality of fins (not shown) along an outer surface of the reservoir 108 to facilitate a transfer of heat between the liquid stored inside the reservoir 108 and the ambient. In some embodiments, the reservoir 108 is made of a material having high thermal conductivity to facilitate a heat transfer between the liquid stored inside the reservoir 108 and the ambient.

In some embodiments, at least a portion of the liquid exiting the liquid ejector 120 is cooled down before being supplier to the reservoir 108. For so doing, the ejector 120 is fluidly connected to a heat exchanger 154 to cool (i.e., reduce a temperature) the liquid expelled by the liquid ejector 120. The heat exchanger 154 may be an air to liquid heat exchanger, and may be disposed downstream of the liquid ejector 120 and upstream of the reservoir 108 and adapted to receive the liquid from liquid ejector 120 and supply cooled liquid to the reservoir 108. As shown, the heat exchanger 154 is fluidly connected to the outlet port 136 via a third pipe 158 and receive the liquid from the liquid ejector 120 via the third pipe 158. Similarly, the heat exchanger 154 is fluidly connected to the reservoir 108 via a fourth pipe 160 and supply the cooled liquid to the reservoir 108 via the fourth pipe 160. In some implementations, only a portion of the liquid expelled from the liquid ejector 120 is provided to the heat exchanger 154 by a bypass conduit. In an embodiment, the portion of the liquid, cooled by the heat exchanger 154, is mixed with a remaining portion of liquid before the liquid enters the reservoir 108. In some implementations, the portion of liquid, cooled by the heat exchanger 154, may directly flow/enters the reservoir 108. In an embodiment, the pressure reducer system 104 may include a blower 162 to increase a flow of air towards the heat exchanger 154 to facilitate the cooling of the liquid flowing through the heat exchanger 154. The blower 162 may be disposed upstream or downstream, in a direction of flow of air to the heat exchanger 154.

In operation, the capability of vacuum generation of the ejector is only as good as the vapor pressure of the motive fluid. As shown in FIG. 1, the motive fluid at in conduit 150 dictates how much vacuum the ejector can generate. At pump 124 if the pumping speed at pump 124 is accelerated, the pressure is increased. As vapor pressure of water in one atmosphere pressure is close to 40 millibars, but if a high pressure fluid is used (in other words, if the pump is pumping into very high speed), then the capability of drawing vacuum may be optimized. Therefore, if the system is pressurized, vacuum pressure below 40 millibars can be generated. In embodiments, the pressure inside the tank is above the vapor pressure of the motive fluid. If the fluid is water and the pressure is 1 atmospheric pressure, then the water reservoir needs to be >about 30 millibars. With the pump 124, motive fluid pressure is significantly increased because that motive fluid pressure drives the vacuum generation.

In embodiments (not shown), the system further includes pressure monitoring device(s), controller(s), etc., so that the speeds are adjusted based on the pressure readings. It should be noted that the (relative) pressure can be below 1 atmosphere. In embodiments, the pressure at the water reservoir 110 is kept at a level above the vapor pressure of the motive fluid, allowing the condensables from the coil to actually turn into liquid (to condense). In turn, the pressure in the conduit 150 to be maintained above the water reservoir, creating significant vacuum in the coil. In embodiments, software programs can be implemented to monitor/regulate the feeds to maintain conditions above and below the vapor pressure of the motive fluid. The use of the booster pump helps facilitate the operation of the system.

Figure 2:
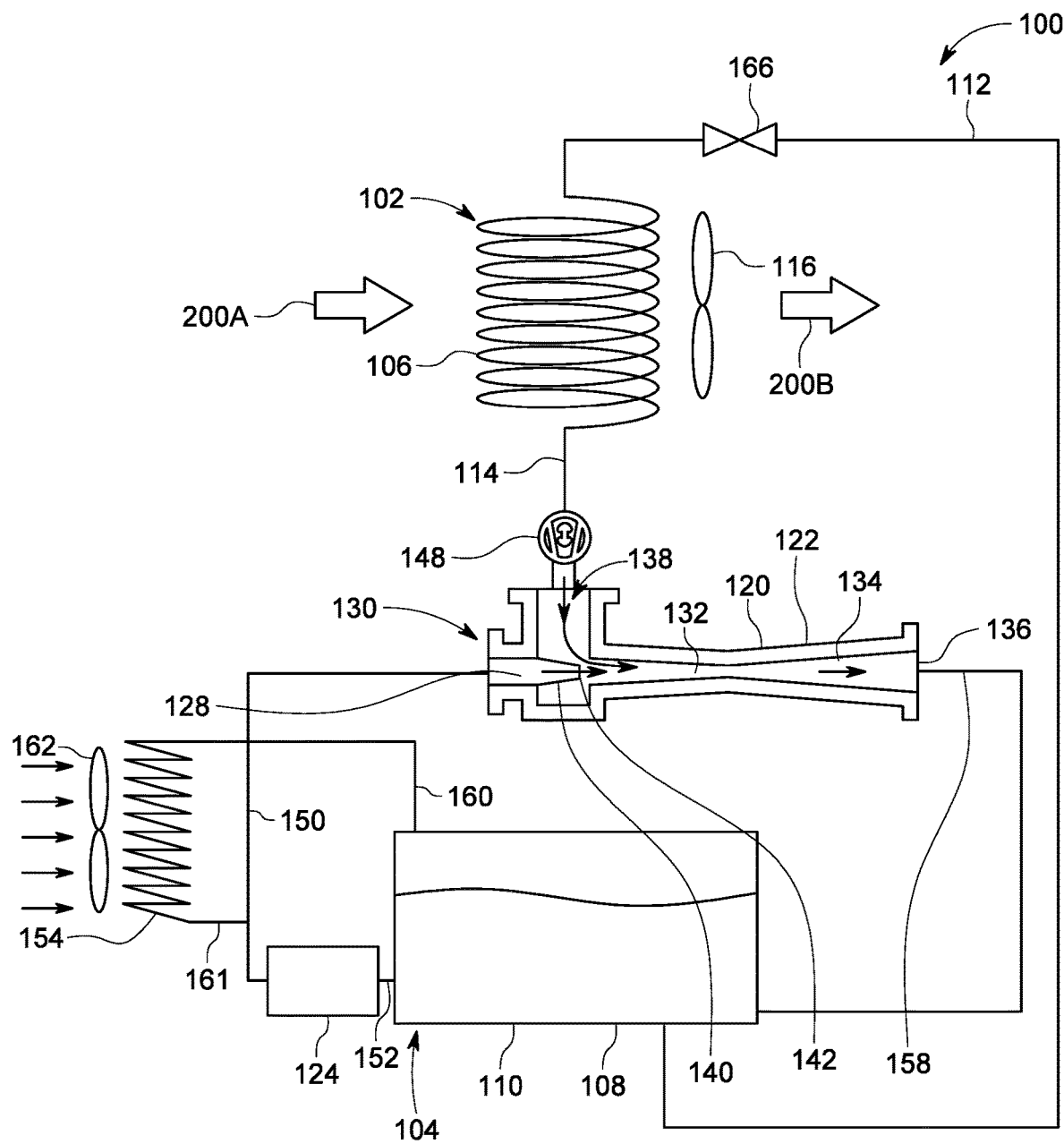
FIG. 2 is a schematic view of an embodiment of an air-cooling system having an evaporator and a pressure reducer system connected to the evaporator and depicting a heat exchanger arranged upstream of a liquid ejector.

According to an alternative embodiment, as shown in FIG. 2, the heat exchanger 154 is arranged downstream of the pump 124 instead of upstream of the reservoir 108 (as shown in FIG. 1). In such a case, the third pipe 158 connects the liquid ejector 120 to the reservoir 108. The heat exchanger 154 is adapted to cool at least a portion of the liquid being pumped by the pump 124 to the liquid ejector 120. In such a case a portion of the motive fluid travelling on conduit 150 is diverted to conduit 161, at a location downstream of the pump 124. This diverted fluid passes through a heat exchanger 154 and returns to reservoir 108 via conduit 160. Also, the blower 162 is shown to be arranged upstream of the heat exchanger 154 to enable a flow of air through the heat exchanger 154. However, the blower 162 may be arranged downstream of the heat exchanger.

Figure 3:
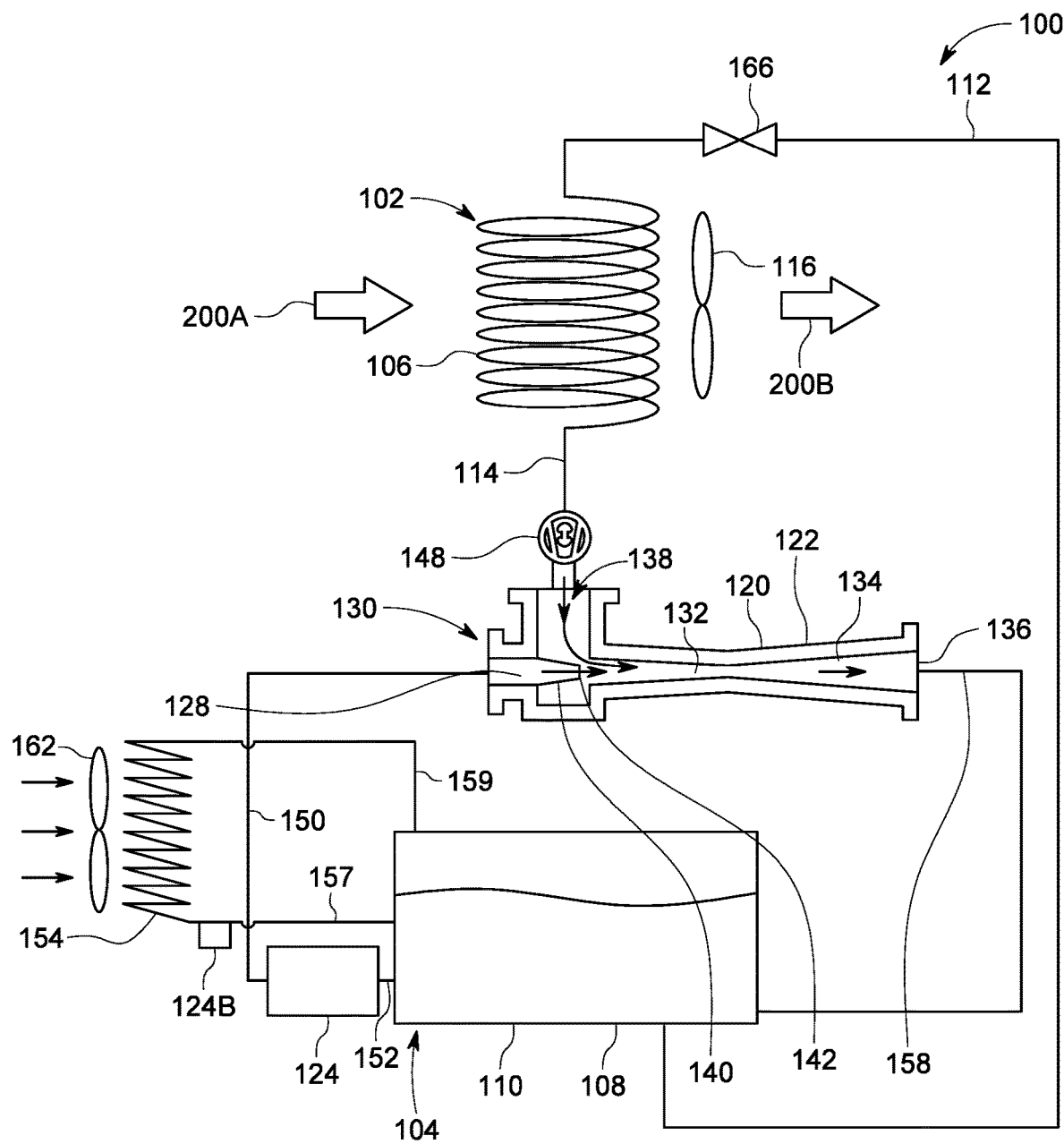
FIG. 3 is a schematic view of an embodiment of an air-cooling system having an evaporator and a pressure reducer system connected to the evaporator and depicting a heat exchanger independently connected to a reservoir of the pressure reducer system.

In another embodiment, as shown in FIG. 3, the liquid reservoir 108 has an independent cooling system comprised of a liquid pump 124B, air/liquid heat exchanger 154 and a fan 162. The system can be activated based on how the liquid temperature compares against a programmed setpoint. As shown in FIG. 3, the heat exchanger 154 is connected with the reservoir 108 via an inlet conduit 157 and an outlet conduit 159, and a second pump 124B provides the liquid from the reservoir 108 to the heat exchanger 154 via the inlet conduit 157 for cooling the liquid. The cooled liquid flows back to the reservoir 108 via the outlet conduit 159. In an embodiment, the second pump 124B pumps the liquid to the heat exchanger 154 when a temperature of the liquid inside the reservoir 108 is above a threshold temperature value. Also, the blower 162 is arranged or positioned upstream of the heat exchanger 154 to allow a flow of air through the heat exchanger 154 for cooling the liquid. However, the blower 162 may be positioned downstream of the heat exchanger 154.

The air-cooling system 100 further includes a metering valve 166 to control an amount of liquid flowing to the evaporator 102 from the reservoir 108. The metering valve 166 may be an electrically controlled valve and is controlled based on a temperature of the ambient and/or the pressure generated inside the evaporator 102. In an embodiment, a controller may control the booster pump 148, the pump 124, and the metering valve 166 to provide a desired level of air cooling.

In some embodiments, before starting the pump 124 that provides the liquid to the liquid ejector 120 from the reservoir 108, a pressure inside the reservoir 108 is reduced by engaging a vacuum pump (not shown) with the reservoir 108. In embodiments, a pressure inside the reservoir 108 is reduced to a value that between 5% to 20% more than the saturated vapor pressure of the liquid at an ambient temperature. The pressure inside the reservoir 108 is reduced to a value depending on the saturated vapor pressure of the liquid at the ambient temperature, e.g., between 40 mbarA to 150 mbarA in embodiments with the use of water. After reducing the pressure inside the reservoir 108 to a desired value, the pump 124 is operated to provide the liquid to the liquid ejector 120. As the liquid leaving the liquid ejector 120 will have higher pressure than the liquid entering the liquid ejector 120. the pressure inside the reservoir 108 increases, causing an increase in pressure of the liquid being delivered to the liquid ejector 120 by the pump 124. This results in higher pressure drop at the throat portion 132, resulting into a generation of desired lower pressure inside the evaporator 102. In this manner, the liquid ejector facilitates in creating a pressure, inside the evaporator 102, less than or equal to the saturated vapor pressure of the liquid at the ambient temperature. In some embodiments, this facilitates in limiting the use of the booster pump 148. In some embodiment, the booster pump 148 may be omitted.

Figure 4:
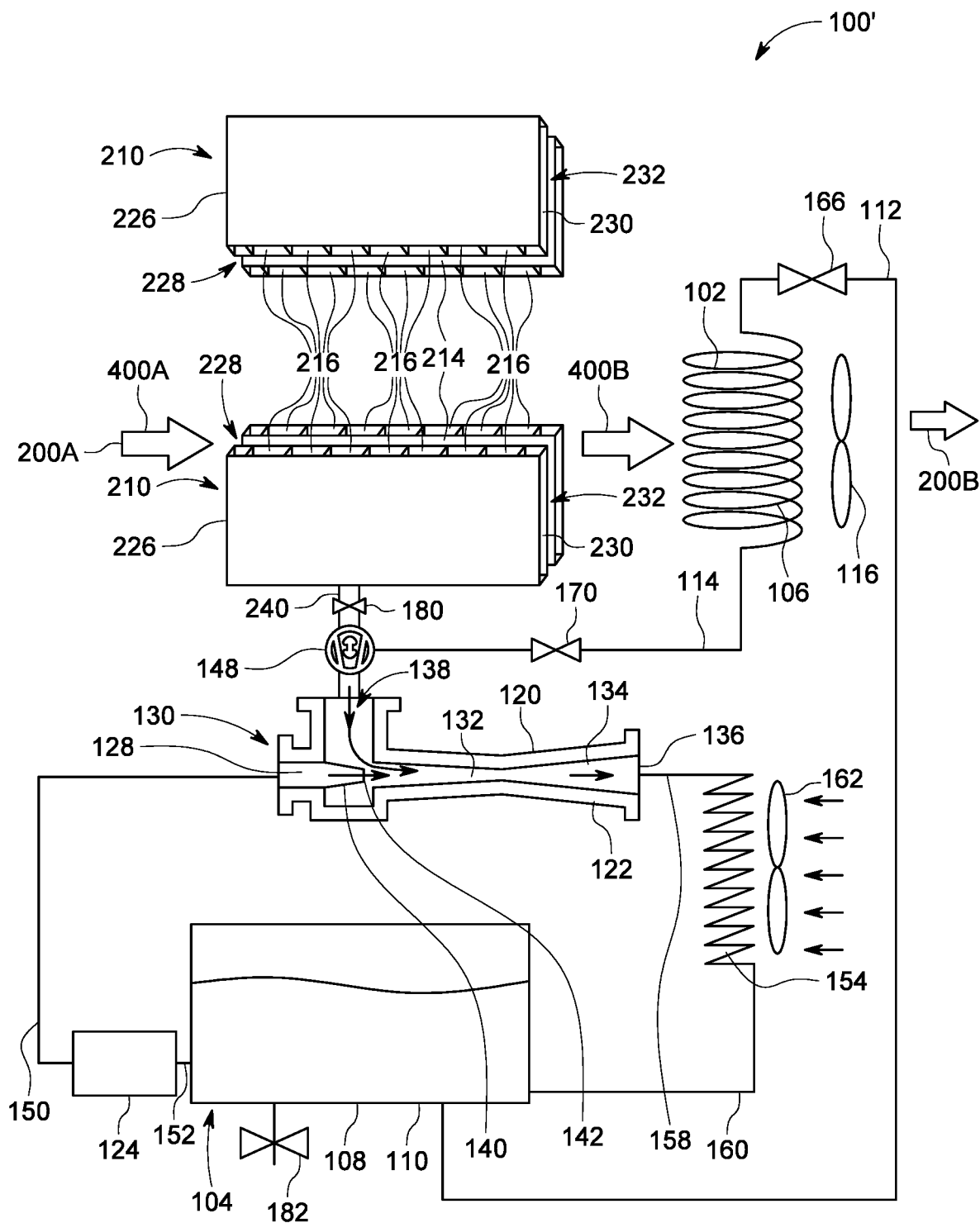
FIG. 4 illustrates a schematic view an embodiment of an air-cooling system having the evaporator, a dehumidification core having air channels separated from vapor channels by a membrane, and the pressure reducer system connected to the evaporator and the dehumidification core.

Referring to FIG. 4, an air-cooling system 100' is shown according to an alternative embodiment of the disclosure. The air-cooling system 100' is similar to the air-cooling system 100 except that the air-cooling system 100' additionally includes a dehumidification core 210 fluidly coupled to the pressure reducer system 104 to facilitate an extraction of moisture from the air, thereby facilitates a control of the moisture or humidity level in the air (second air stream 200B) being delivered to a room or area. Accordingly, the dehumidification core 210 receives an (also referred to as inlet air 400A) having relatively high moisture content and discharges an air having relatively low moisture content (also referred to as outlet air 400B). Due the pressure differential between the channels, a moisture gradient is created with the moisture content is reduced in the lower pressure environment, thus accelerating the flux.

For so doing, referring to FIGS. 4, 5, 6, and 7, the dehumidification core 210 defines at least one air channel 214 through which the 400A flows, and at least one vapor channel 216 that receives moisture (e.g., water vapors 220 extracted from the inlet air 400A) flowing through the at least one air channel 214. As shown, each vapor channel 216 is disposed adjacent to one or more of the air channels 214 and is separated by a membrane 222. Conversely, each air channel 214 is disposed adjacent to one or more of the vapor channels 216 and is separated from the adjacent vapor channels 216 by the membrane 222.

Figure 5:
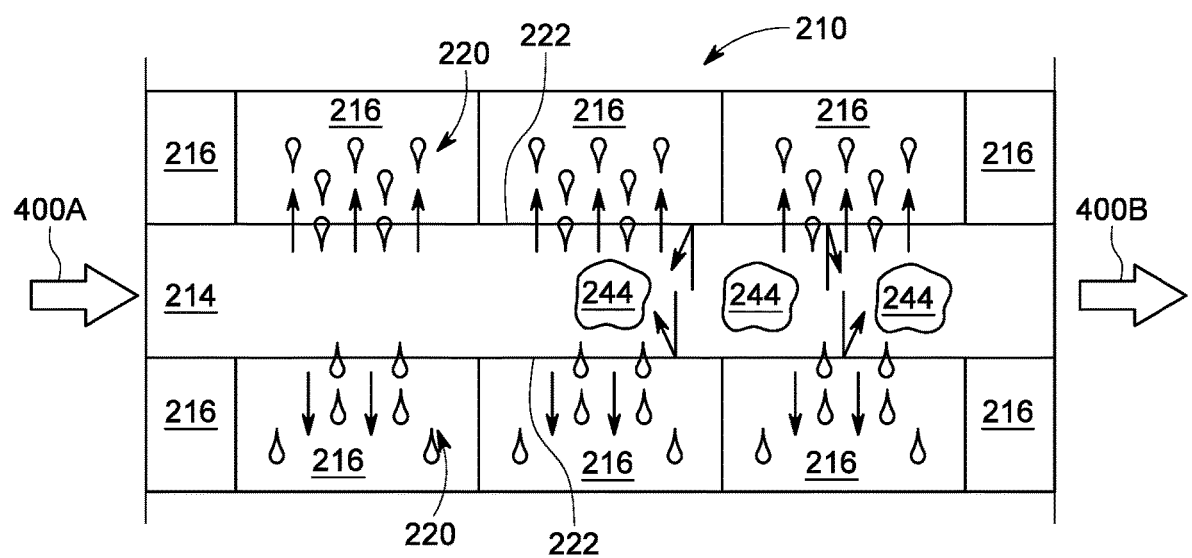
FIG. 5 is a schematic top view of a portion of an embodiment of a dehumidification core, having a flow of the water vapors from the air flowing through the air channel to the vapor channels.
Figure 6:
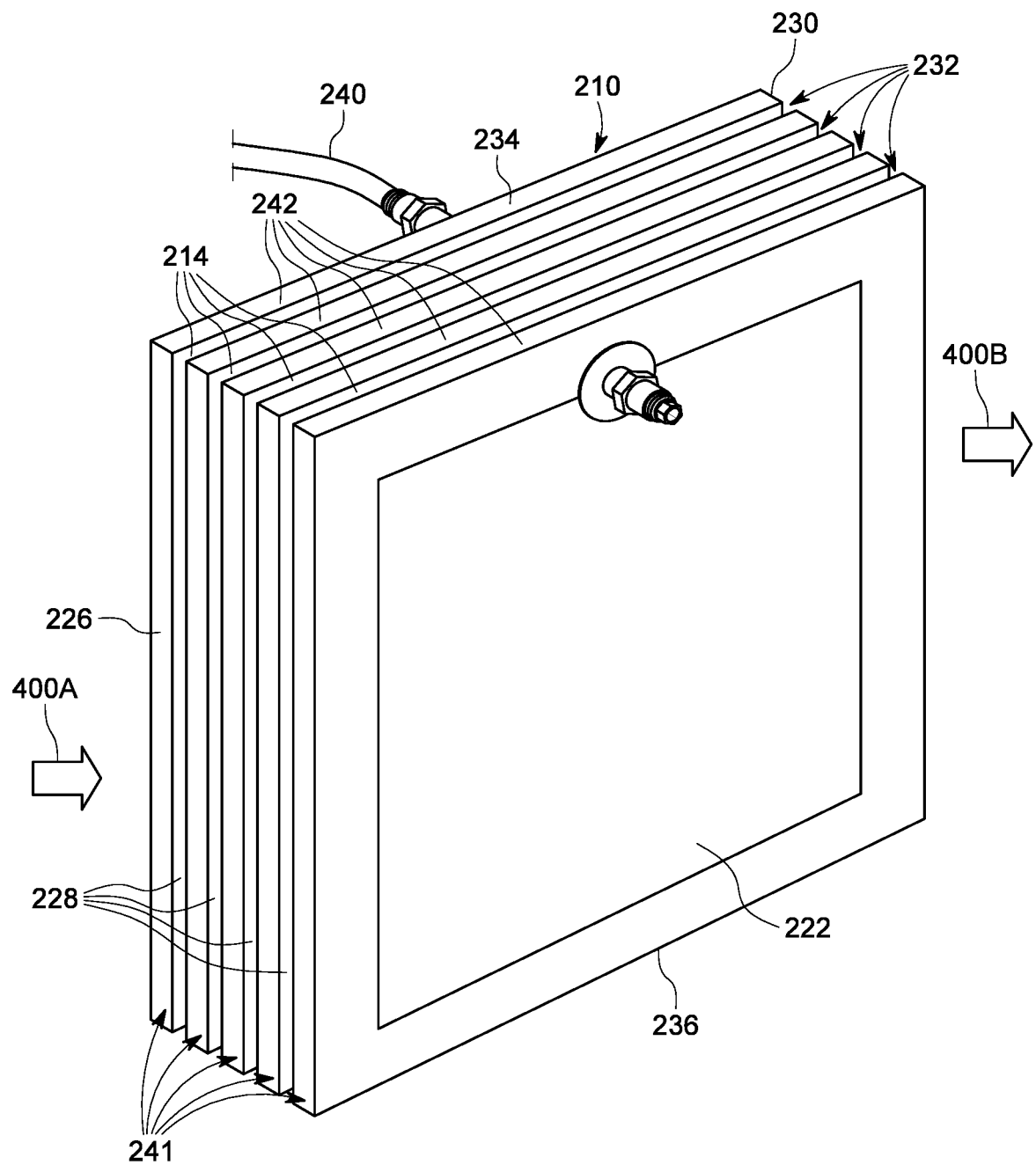
FIG. 6 is perspective view of an embodiment of a dehumidification core having air channels extending from a first face to a second face.

In an embodiment, as shown in FIG. 6, the dehumidification core 210 has a box structure, with a first face 226 disposed substantially perpendicular to the flow of inlet air 400A and defining an inlet 228 for each of the air channel 214, and a second face 230 disposed substantially parallel to the first face 226 and defining an outlet 232 of each of the air channel 214. Accordingly, the inlet air 400A enters the air channels 214 through the first face 226 and exits the dehumidification core 210 through the second face 230 as the outlet air 400B. The moisture (i.e., the water vapors 220) so removed from the inlet air 400A is collected into the vapor channels 216 (as shown in FIG. 5).

As shown, each vapor channel 216 may extend in a direction substantially perpendicular to a direction of extension of the air channels 214, and may extend in a direction substantially perpendicular to a third face 234 (i.e., top face 234) of the dehumidification core 210 and a fourth face 236 (i.e., bottom face 236) of the dehumidification core 210. Further, the fourth face 236 may define a closed end of each of the vapor channel 214, thereby preventing an exit of the water vapors 220 from the dehumidification core 210 through the bottom face 236, while an outlet 238 (shown in FIG. 7) for each vapor channel 214 may be disposed proximate to the top face 234 to facilitate an exit of the water vapors 220 from the vapor channels 216. In an embodiment, the dehumidification core 210 may include one or more collection channels (not shown) disposed proximate to the top face 234 and in fluid communication with the outlets 238 of the vapor channels 216. In such a case, the outlets 238 may be defined by an intermittent surface of the dehumidification core 210 that may be disposed proximate to the top face 234 and extends parallel to the bottom face 236. In some embodiments, the one or more collection channels (not shown) may extend substantially parallel to the air channels 214 and may include closed ends at the first face 226 and the second face 230.

Figure 7:
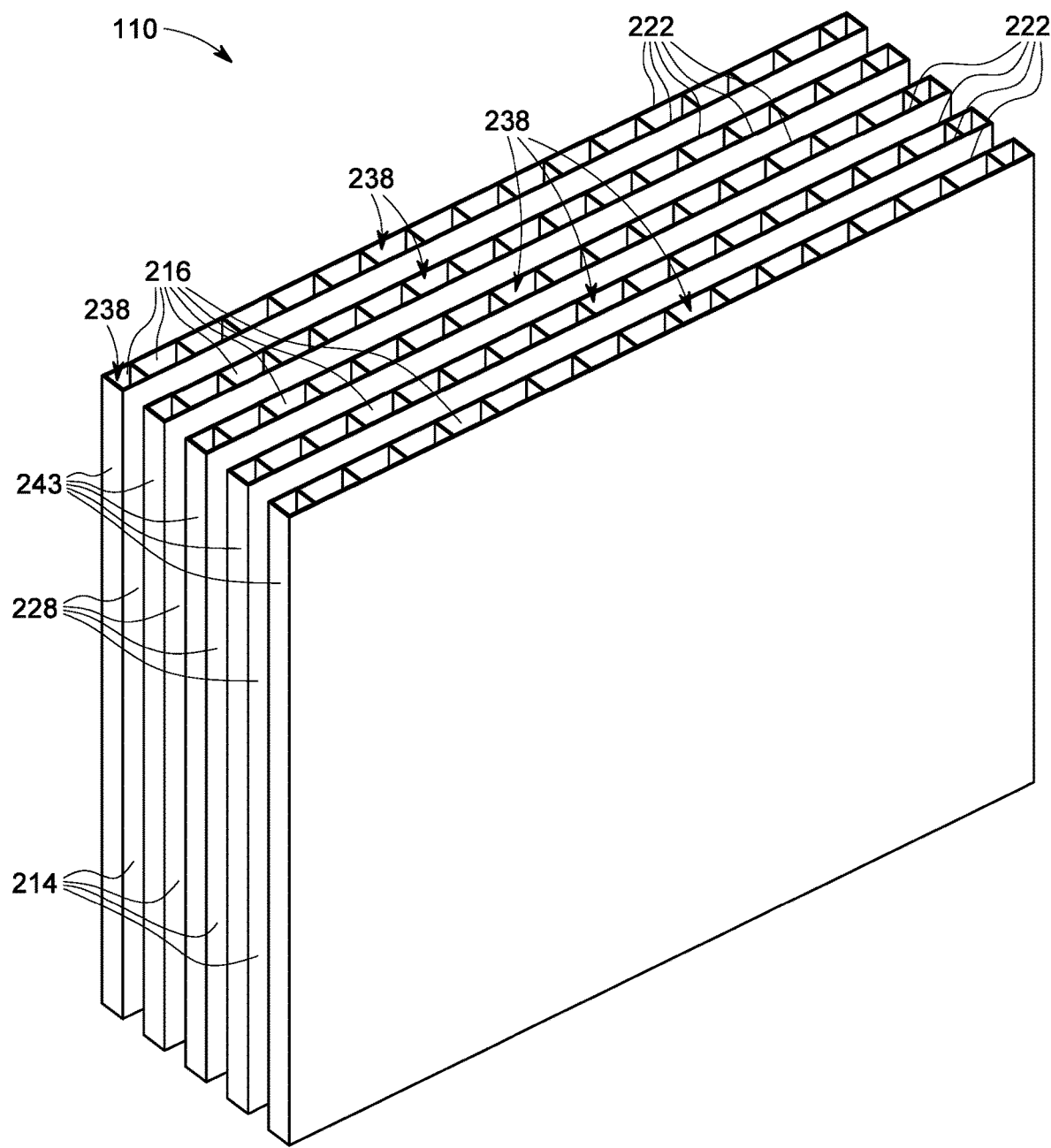
FIG. 7 is sectional view of the dehumidification core of FIG. 4, depicting the vapor channels extending substantially perpendicular to a direction of extension of air channels.

Also, as shown in FIG. 6 and FIG. 7, the dehumidification core 210 is formed by arranging a plurality of stacks 241 such that the stacks 241 are arranged parallel to and spaced apart from each other to define air channels 214 therebetween. The stacks 241 are arranged in a manner such that membrane 222 of one stack 241 faces the membrane 222 of the adjacent stack 241. Further, each stack 241 includes an outer frame 242 and a corrugated structure 243 disposed inside the outer frame 242 and supported by the outer frame 242. As shown, the outer frame 242 is attached to an outer edge of the corrugate structure 243. Further each corrugated structure 243 defines the plurality of vapor channels 216 having a substantially rectangular shape. Further, each corrugated structure 243 includes two membranes 222, one membrane 222 disposed at a first side of the corrugated structure 243, and other membrane 222 disposed on second side, opposite to the first side, of the corrugated structure 143. Accordingly, the corrugated structure 243 is arranged between the two membranes 222. Accordingly, the membrane 222 separates the vapor channels 216 of the corrugated structure 243 from the air channel 214 defined between two adjacent stacks 241.

Although a box, e.g., cuboidal structure having the vapor channels 216 extending substantially perpendicular to the air channels 214 is contemplated, it may be appreciated that that the dehumidification core 210 may include any other suitable shape or structure known in the art. Further, it may be envisioned that the air channels 214 and the vapor channels 216 may extend substantially in a same direction and may run parallel to each other. Also, the dehumidification core 210 having concentric air channels 214 and vapor channels 216 may also be envisioned. Further, the dehumidification core 210 may include a conduit 240 (shown in FIGS. 4, and 6) in fluid communication with each vapor channel 216 to receive the water vapors 220 and facilitates an exit of water vapors 220 from the dehumidification core 210.

As shown in FIG. 5, the movement of the water vapors 220 from the air flowing through the air channels 214 to the vapor channels 216 is facilitated by the membrane 222, while flow of other components 244, for example, nitrogen, oxygen, carbon dioxide, etc., of the air from the air channels 214 to the vapor channels 216 is substantially blocked by the membrane 222. In some embodiments, the membrane 222 may block a flow of about 99 percent of the other components 244 from the air channels 214 to the vapor channels 216. In certain implementations, the membrane 222 may block a flow of about 95 percent to 99 percent of other components 244 from the air channels 214 to the vapor channels 216.

The membrane 222 facilitates an extraction of the water vapors 220 from the air flowing through the air channels 214 and flow of the water vapors 220 into the adjacent vapor channels 216, through the membrane 220, in response to a presence of relatively low pressure inside the vapor channels 216 than the air channels 214. As such, a humidity gradient is established between the air channels 214 and adjacent vapor channels 216. The humidity gradient is generated by creating a pressure gradient/differential between the air channels 214 and adjacent vapor channels 216. In particular, a partial pressure of water vapor inside the vapor channels 216 is maintained at a level lower than a partial pressure of water vapor inside the air channels 214 to pull the water vapors 220 in the air flowing through the air channels 214 toward the suction side (i.e., the vapor channels 216).

The conduit 240 facilitates the connection of the pressure reducer system 104 to the vapor channels 216 and facilitates the maintenance of the desired reduced pressure inside the vapor channels 216 to create the desired pressure differential between the vapor channels 216 and the air channels 214. As with the evaporator 102, the pressure reducer system 104 (i.e., the liquid ejector 120 and the booster pump 148) creates a pressure inside the vapor channels 216 corresponding to a saturated vapor pressure of the liquid, e.g., water at an ambient temperature. In an embodiment, the booster pump 148 and the water ejector 122 together reduce the pressure inside the vapor channels 216 between 20 mbarA to 40 mbarA. In one embodiment, the pressure reducer system 104 may create a pressure of less than 20 mbarA at the inlet of the booster pump 148. In one embodiment, the pressure reducer system 104 may create a pressure of less than 10 mbarA at the inlet of the booster pump 148. In one embodiment, the pressure reducer system 104 may create a pressure between 10 mbarA and 20 mbarA at the inlet of the booster pump 148. The booster pump 148 and the water ejector 122 may be controlled to reduce the pressure inside the vapor channels based on a size of the air-cooling system 100' and a desired water extraction rate.

Further, the air-cooling system 100' includes at least one valve, for example, a first valve 170 and a second valve 180, to facilitate the selective connection of the evaporator 102 and/or the dehumidification core 210 with the pressure reducer system 104. As shown, the first valve 170 is arranged to control a connection or disconnection of the evaporator 102 with the pressure reducer system 104 and is adapted to move between a first position and a second position. In the first position, the first valve 170 allows a fluid connection of the evaporator 102 to the pressure reducer system 104 and allows the flow of vapors from the evaporator to the liquid ejector 120, while in the second position, the first valve 170 fluidly disconnect the evaporator 102 from the pressure reducer system 104, and thus prevents the flow of vapors from the evaporator 102 to the liquid ejector 120. As shown, the first valve 170 is arranged upstream of the pressure reducer system 104 and downstream of the evaporator 102.

Similarly, the second valve 180 is arranged to control a connection or disconnection of the dehumidification core 210 with the pressure reducer system 104 and is adapted to move between an open position and a close position. In the open position, the second valve 180 allows a fluid connection of the vapor channels 216 to the pressure reducer system 104 and allows the flow water vapors 220 from the vapor channels 216 to the liquid ejector 120, while in the close position, the second valve 180 fluidly disconnect the vapor channels 216 from the pressure reducer system 104, and thus prevents the flow of water vapors 220 from the vapor channels 216 to the liquid ejector 120. As shown, the second valve 180 is arranged upstream of the pressure reducer system 104 and downstream of the dehumidification core 210. In an embodiment, the first valve 170 and the second valve 180 are electrically controlled valves and operated by a controller based on the desired cooling and the humidity level of air received from the room. In some scenarios, only the evaporator 102 is fluidly connected with the pressure reducer system 104 by moving the first valve 170 to the first position and moving the second valve 180 to the close position. Similarly, only the dehumidification core 210 may be fluidly connected to the pressure reducer system 104 by moving the second valve 180 to the open position and moving the first valve 170 to the second position. Further, to simultaneously connect the evaporator 102 and the dehumidification core 210 with the pressure reducer system 104, the first valve 170 is moved to the first position and the second valve 180 is moved to the open position.

Furthermore, in some embodiments, the air-cooling system 100' may include a controller and a plurality of sensors for controlling an operation of the air-cooling system 100'. In an embodiment, the air-cooling system 100' may include one or more temperature sensors and one or more humidity sensors to monitor a temperature and a humidity of at least one of the first airstream 200A, the inlet air 400A, the outlet air 400B, and the second air stream 200B. Accordingly, the controller may control the pump 124 to deliver the liquid at an optimum speed and the booster pump 148 to maintain or create desired level of vacuum or pressure inside the vapor channels 216 and/or the evaporator 102.

Although, the air-cooling system 100' having a single evaporator 102 and single dehumidification core 210 is shown and contemplated, it may be appreciated that the air-cooling system 100' may include any number of dehumidification core 210 and the evaporator 102 arranged in series configuration, or a parallel configuration, or a combination thereof.

A working of the air-cooling system 100' having the dehumidification core 210 and the evaporator 102 fluidly connected with the pressure reducer system 104 is now explained. For so doing, the first valve 170 is moved to the first position and the second valve 180 is moved to the open position. The air-cooling system 100 receives the first airstream 200A having relatively higher humidity level and higher temperature from the room and supplies the second airstream 200B having relatively less humidity level and less temperature to the room. For so doing, the air-cooling system 100' receives the first airstream 200A from the room. In an embodiment, the fan 116 may facilitate a suction/intake of the first airstream 200A from the room. Upon entering the first unit 700, the first airstream 200A enters the dehumidification core 210 as inlet air 400A, flows through the air channels 214, and exits the dehumidification core 210 as the outlet air 400B. During the flow of the inlet air 400A through the air channels 214, at least a portion of the water vapors 220 present into the inlet air 400A flows through the membrane 222 and inside the adjacent vapor channels 216. For facilitating the extraction of the water vapors 220 from the inlet air 400A, and the movement of the water vapors 220 inside the vapor channels 216, a pressure differential is created. The pressure differential is created by creating or maintaining a relatively lower pressure inside the vapor channels 216 as compared to the pressure inside the air channels 214. In fact, to ensure a flow of the water vapors 220 across the membrane 222, the partial pressure of water vapors inside the vapor channels 216 is maintained at a lower value relative to the saturated vapor pressure of water at the ambient temperature inside the air channels 214. For so doing, the controller may control and operates the pump 124 to pump the liquid, in this case the liquid water, from the reservoir 108 to the inlet port 130 of the liquid ejector 120, in this case, the water ejector 122, at an appropriate speed (i.e., a predetermined quantity of the liquid water enters the inlet portion 128 per second) and operates and control the booster pump 148. The appropriate speed of the liquid water entering the water ejector 122 and the speed of the booster pump 148 may be determined based on the humidity level of the room and/or the humidity level of the inlet air 400A, a temperature of the inlet air 400A, a desired temperature and humidity level of the air being delivered to the room, and/or a speed and amount of first airstream 200A entering the air-cooling system 100'.

As the liquid water flows though the inlet portion 128 and enters the throat portion 132, the speed of the liquid water increases, and reaches a maximum value at the throat portion 132. Consequently, a relatively low pressure (i.e., vacuum) is created at the throat portion 132, and hence a relatively low pressure is created inside the vapor channels 216 as the vapor channels 216 are in fluid communication with the throat portion 132 via the vapor inlet port 138 and the conduit 240. It may be appreciated that a value of pressure inside the vapor channels 216 may be relatively higher as compared to a value of pressure at an outlet of the booster pump 148 due to loss of vacuum caused by the length of conduit 240 and any other bends in the conduit 240. Further, pressure reduced system 104 is controlled such that the pressure at the outlet of the booster pump 148 is lower and at a desired pressure differential than the pressure inside the air channels 214. Owing to the differential pressure between the vapor channels 216 and the air channels 214, the water vapors 220 are extracted from the air flowing through the air channels 214 and moves across the membrane 222 to the vapor channels 216. Similarly, the water vapors 220 extracted from the inlet air 400A may move/flow through the conduit 240 and the booster pump 148, and enters the throat portion 132 via the vapor inlet port 138 due the pressure differential between the vapor channels 216 and the throat portion 132. Upon entering the water ejector 122 (i.e., the throat portion 132), the water vapors 220 may move along the liquid water and enters the outlet portion 134 of the water ejector 122. Due to the increase of the cross-sectional area in the outlet portion 134, the velocity of the liquid water decreases, thereby creating a relative high pressure inside the outlet portion 134 as compared to the pressure inside the throat portion 132. Accordingly, the water vapors 220 received from the vapor channels 216 condense inside the outlet portion 134 before leaving the water ejector 122. Accordingly, a need for a separate condenser for condensing the water vapors 220 into the liquid water is eliminated, thereby increasing an efficiency of the air-cooling system 100'.

Heat may be generated due to the condensation of the water vapors 220 inside the outlet portion 134 of the water ejector 122, resulting into an increase in temperature of the liquid water exiting the outlet port 136 of the water ejector 122. To reduce the temperature of the liquid water before delivering the liquid water to the water reservoir 110, at least a portion of the liquid water is directed to the heat exchanger 154 that facilitates the cooling of the received liquid water. Thereafter, the cooled liquid water is supplied to the water reservoir 110 for storage and is available for subsequent supply to the water ejector 122 by the pump 124. It may be noted that a volume of the liquid water exiting the water ejector 122 and received by the water reservoir 110 may be higher than a volume of the liquid water supplied by the pump 124 to the water ejector 122 due to the condensation of the water vapors 220 received from the dehumidification core 210. Accordingly, the level of the liquid water inside the water reservoir 110 may increase. For preventing an overflow of the reservoir 110 and spilling of the liquid water from the water reservoir 110, a drain valve 182 may be opened when the level of the liquid water inside the water reservoir 110 is above a first threshold level. Opening of the drain valve 182 may allow a drainage of the liquid water from the water reservoir 110. Further, the drain valve 182 may be closed in response to a decrease of the level of the liquid water below a second threshold value. In certain implementations, the drain valve 182 is adapted to automatically opened and closed, respectively, in response to the level of the liquid water reaching above the first threshold value and falling below the second threshold value.

Although not shown in FIGS. 1 to 3, in embodiments, the air-cooling system 100 further has a drain valve to facilitate a drainage/removal of the liquid from the reservoir 108.

Further, the outlet air 400B expelled from the dehumidification core 210 is received by the evaporator 102, gets cooled, and exit the evaporator 102 as the second air stream 200B. As the outlet air 400B passes over evaporator 102, the outlet air 400B may cause the evaporation of liquid water flowing inside the evaporator coil 106 due to the low pressure created inside the evaporator coil 106 by the water ejector 122 and the latent energy provided by the outlet air 400B, causing a conversion of at least a portion of the liquid water flowing inside the evaporator coil 106 into water vapors. Accordingly, a temperature of the outlet air 400B decreases upon passing through the evaporator 102. Therefore, the second airstream 200B discharged from the evaporator is relatively cooler than the outlet air 400B received from the dehumidification core 210. The second airstream 200B after passing over the evaporator 102, exits the air-cooling system 100' and enters the room. A utilization of the liquid water as motive fluid for creating low pressure inside the throat portion 132, and hence inside the vapor channels 216, facilitates in decreasing energy consumption due to non-compressible nature of the liquid water. Further, a use of the water ejector 122 as a pressure reducing means prevents cavitation related damages relative to a scenario in which a conventional pump is used for creating low pressure or vacuum in the vapor channels 216. Also, use of the water ejector 122 facilitates in decreasing an overall size of the air-cooling system. When the second valve is moved to the closed position, the dehumidification core 210 is isolated and the air-cooling system 100' only cools the first air stream 200A and provides the cooled air to the room. Accordingly, in this case, the air-cooling system 100' may work in a manner identical to the air-cooling system 100. In a scenario, the second valve 180 may be moved to the open position and the first valve 170 is moved to the second position. In such a case, the evaporator 102 is isolated from the air-cooling system 100' and the air-cooling system 100' facilitates aa removal of the moisture from the first airstream 200A. Accordingly, the second airstream 200B being delivered to the room has a lower humidity level relative to the first airstream 200A.

The use of water ejector 122 provides a capability of handling high condensable fraction in the form of water vapor, as well as creating a source of fresh water as it condenses moisture extracted at the dehumidification core 210. Further the water ejector 122 is capable of generating vacuum pressures as low as 5 mbar absolute (expressed as mbarA. Also, the water ejector 122 along with the booster pump 148 can be tailored to operate in a range of vacuum pressures such as 100 mbarA, 150 mbarA or even 500 mbarA or greater. Vacuum pressure is regulated by adjusting fluid variables such as pressure and flow rate.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:
1. An air-cooling system, comprising:
an evaporator adapted to cool an air passing through the evaporator;
a reservoir for storing a liquid and fluidly connected to the evaporator and providing the liquid to the evaporator; and
a pressure reducer system fluidly coupled to the evaporator and adapted to create a pressure less than or equal to a saturated vapor pressure of the liquid at an ambient temperature inside the evaporator to facilitate a conversion of at least a portion of the liquid flowing through the evaporator into vapors, the pressure reducer system including:
a liquid ejector having:
an inlet portion adapted to receive the liquid from the reservoir,
a throat portion arranged downstream of the inlet portion and fluidly coupled to the evaporator, wherein the throat portion is adapted to increase a velocity of the liquid received from the inlet portion, and
an outlet portion disposed downstream of the throat portion and configured to increase a pressure inside the liquid ejector to facilitate a condensation of the vapors received from the evaporator;
a pump fluidly connected to the liquid ejector and the reservoir and configured to supply the liquid from the reservoir to the liquid ejector; and
a dehumidification core arranged upstream or downstream of the evaporator and adapted to fluidly couple with the liquid ejector, the dehumidification core includes
an air channel,
at least one vapor channel separated from the air channel, and
a membrane separating the at least one vapor channel from the air channel and adapted to facilitate a removal of moisture from an air flowing through the air channel, wherein the membrane is selectively permeable to water and water vapors and impermeable to air and includes an ion exchange capacity of at least 1.0 milliequivalents per gram, wherein
the throat portion is fluidly coupled to the at least one vapor channel to create a relatively lower pressure within the at least one vapor channel than in the air channel to facilitate a flow of moisture from the air flowing through the air channel to the at least one vapor channel, and
the outlet portion facilitates a condensation of the water vapors received from the at least one vapor channel.

2. The air-cooling system of claim 1, wherein the pressure reducer system further includes a booster pump arranged upstream of the liquid ejector and fluidly coupled to the evaporator to reduce the pressure inside the evaporator to a pressure below the saturated vapor pressure of the liquid.

3. The air-cooling system of claim 2, wherein the liquid is water and the booster pump facilitates in reducing the pressure to a value less than or equal to 31.7 mbarA at 25 degree Celsius.

4. The air-cooling system of claim 2, wherein the booster pump facilitates in reducing the pressure to a value less than the saturation vapor pressure of the fluid in the evaporator, or a value between 20 mbarA and 40 mbarA, or between 10 mbarA and 20 mbarA.

5. The air-cooling system of claim 1, wherein the reservoir includes a drain valve for facilitating a drainage of the liquid from the reservoir when a level of the liquid inside the reservoir reaches above a first threshold level.

6. The air-cooling system of claim 1, further including a heat exchanger fluidly connected to the liquid ejector and configured to receive at least a portion of the liquid exiting the liquid ejector, wherein the heat exchanger is configured to cool the received liquid.

7. The air-cooling system of claim 6, wherein the heat exchanger is disposed upstream of the reservoir and supply the cooled liquid to the reservoir.

8. The air-cooling system of claim 1, wherein the liquid ejector is a water ejector adapted to receive liquid water from the pump, and whether the system further includes a metering valve arranged between the reservoir and the evaporator to control a flow of the liquid from the reservoir to the evaporator.

9. The air-cooling system of claim 1, wherein the pressure reducer system further includes a booster pump arranged upstream of the liquid ejector and connected to the dehumidification core to reduce the pressure inside the at least one vapor channel to a pressure below a saturated vapor pressure of the water.

10. The air-cooling system of claim 1, further including a valve arranged between pressure reducer system and the dehumidification core to control the fluid connection of the dehumidification core with the pressure reducer system.

11. The air-cooling system of claim 1, wherein the membrane comprises a sulfonated polymer.

12. An air-cooling system, comprising:
at least one dehumidification core defining an air channel and at least one vapor channel separated from the air channel and including a membrane;
an evaporator adapted to cool the air passing through the evaporator and arranged downstream or upstream of the dehumidification core;
a pressure resistant reservoir for storing a liquid and fluidly connected to the evaporator for providing the liquid to the evaporator; and
a pressure reducer system fluidly coupled to at least one of the evaporator or the dehumidification core and adapted to create
a pressure less than or equal to a saturated vapor pressure of the liquid at an ambient temperature inside the evaporator to facilitate a conversion of at least a portion of the liquid flowing through the evaporator into vapors when fluidly coupled to the evaporator, and
a relatively lower pressure inside the at least one vapor channel than the air channel to facilitate an extraction of moisture from the air flowing through the air channel to the at least one vapor channel when fluidly coupled to the dehumidification core, the pressure reducer system includes a liquid ejector having
an inlet portion adapted to receive the liquid from the reservoir,
a throat portion arranged downstream of the inlet portion and fluidly coupled to the at least one of the evaporator or the at least one vapor channel, wherein the throat portion is adapted to increase a velocity of the liquid received from the inlet portion, and
an outlet portion disposed downstream of the throat portion and configured to increase a pressure inside the liquid ejector to facilitate a condensation of the vapors received from the at least one of the evaporator or the dehumidification core; and
a pump fluidly connected to the liquid ejector and the reservoir and configured to supply the liquid from the reservoir to the liquid ejector;
wherein the dehumidification core is arranged upstream or downstream of the evaporator and adapted to fluidly couple with the liquid ejector, and
wherein the membrane separating the at least one vapor channel from the air channel and adapted to facilitate a removal of moisture from an air flowing through the air channel, wherein the membrane is selectively permeable to water and water vapors and impermeable to air and includes an ion exchange capacity of at least 1.0 milliequivalents per gram, wherein
the throat portion is fluidly coupled to the at least one vapor channel to create a relatively lower pressure within the at least one vapor channel than in the air channel to facilitate a flow of moisture from the air flowing through the air channel to the at least one vapor channel, and
the outlet portion facilitates a condensation of the water vapors received from the at least one vapor channel.

13. The air-cooling system of claim 12, further including at least one valve to control fluidly coupling of the pressure reducer system to at least one of the evaporator or the dehumidification core.

14. The air-cooling system of claim 12, wherein the pressure reducer system further includes a booster pump arranged upstream of the liquid ejector to reduce the pressure inside at least one of the evaporator to a pressure below a saturated vapor pressure of the liquid or the at least one vapor channel of the dehumidification core to a pressure below a saturated vapor pressure of the water.

15. The air-cooling system of claim 14, wherein the liquid is water and the booster pump facilitates reducing the pressure to a value less than or equal to 31.7 mbarA at 25 degree Celsius; or <150 mbarA; or between 20 mbarA and 40 mbarA; or between 10 mbarA and 20 mbarA.

16. The air-cooling system of claim 12, wherein the reservoir includes a drain valve for facilitating a drainage of the liquid from the reservoir when a level of the liquid inside the reservoir reaches above a first threshold level.

17. The air-cooling system of claim 12, further including a heat exchanger fluidly connected to the liquid ejector and configured to receive at least a portion of the liquid exiting the liquid ejector, wherein the heat exchanger is configured to cool the received liquid.

18. The air-cooling system of claim 12, wherein the heat exchanger is disposed upstream of the reservoir and supply the cooled liquid to the reservoir, and wherein the evaporator is arranged downstream of the dehumidification core.

* * * * *